United States Patent [19]

Carson

[11] 4,279,018

[45] Jul. 14, 1981

[54] PN LOCK INDICATOR FOR DITHERED PN CODE TRACKING LOOP

[76] Inventor: Robert A. Frosch, Administrator of the National Aeronautics and Space Administration, with respect to an invention of Lansing M. Carson, Tempe, Ariz.

[21] Appl. No.: 17,886

[22] Filed: Mar. 6, 1979

[51] Int. Cl.³ .................... H04L 7/08; H04L 27/22
[52] U.S. Cl. .................. 364/514; 331/DIG. 2; 329/122; 375/1
[58] Field of Search .................. 364/819, 517–518; 331/DIG. 2; 329/122; 375/1, 96, 120

[56] References Cited

U.S. PATENT DOCUMENTS

| | | |
|---|---|---|
| 3,562,420 | 2/1971 | Thompson . |
| 3,909,735 | 9/1975 | Anderson et al. ............. 331/DIG. 2 |
| 3,922,602 | 11/1975 | Lunquist ........................ 331/DIG. 2 |
| 3,961,282 | 6/1976 | Chen et al. ..................... 331/DIG. 2 |
| 4,017,798 | 4/1977 | Gordy et al. ............................ 375/1 |
| 4,039,749 | 8/1977 | Gordy et al. ............................ 375/1 |
| 4,045,796 | 8/1977 | Kline Jr. ............................... 364/819 |
| 4,048,566 | 9/1977 | Carson et al. . |
| 4,092,606 | 5/1978 | Ryan ............................... 331/DIG. 2 |
| 4,100,503 | 7/1978 | Lindsey ..................... 331/DIG. 2 X |
| 4,122,393 | 10/1978 | Gordy et al. ..................... 375/120 X |

*Primary Examiner*—Felix D. Gruber
*Attorney, Agent, or Firm*—Monte F. Mott; John R. Manning; Paul F. McCaul

[57] ABSTRACT

In a delay-lock one-delta ($\pm\frac{1}{2}$ chip) dithered PN code tracking loop, an indication of lock in the PN code tracking loop is provided by delaying the dithered local PN code by a half chip to produce a $+0, -1$ dithered PN code that is then multiplied with the received PN-spread IF signal to produce a signal proportional to the correlation of this dithered code offset from the received code. The correlation signal is bandpass filtered, amplified with AGC control, and square-law detected to obtain a DC signal proportional to the degree of correlation. The DC signal is multiplied by the dithering control signal to effectively subtract noise voltage from the lock correlation signal which is then compared with a PN lock status signal.

6 Claims, 4 Drawing Figures

PN LOCK INDICATOR FOR DITHERED PN CODE TRACKING LOOP

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

This invention relates to a pseudorandom (PN) code tracking loop, and more particularly to a technique for providing an indication of lock in a PN code tracking loop.

Modulation of a carrier with PN codes is often used to spread the carrier (and command/data sideband) energy over a wide bandwidth for anti-jamming, security or radiated energy density reduction purposes. In order to despread and demodulate these signals a receiver must correlate and phase track an identical local code with the code used to spread the signal.

In the past, a receiver which must receive a signal spread by PN-code modulation has used a PN code tracking loop at IF that dithers a local PN code (i.e., that continually advances and retards the PN code in phase a half code bit period hereinafter referred to as a "half chip") at some low frequency, typically at 200 Hertz. The PN-spread IF signal is correlated (multiplied) with the dithered PN and bandpass filtered to produce a partially despread IF signal. This despread IF signal is then amplified and square-law detected to obtain a phase error (DC) signal proportional to the degree of correlation. The phase error signal is applied to a voltage controlled crystal oscillator (VCXO) which in turn controls the phase of the PN code generator, but without giving any indication of PN code tracking loop lock. An object of this invention is to provide an indication of lock in a dithered PN code tracking loop.

SUMMARY OF THE INVENTION

In accordance with the present invention, a separate correlation channel similar to the PN tracking channel is used for determining phase lock of a local PN ode to the received PN code, and applying the local PN code (dithered for the PN tracking channel) to the separate correlation channel through a delay means for retarding the PN code a period equal to the half chip by which the PN code is dithered for the tracking channel. When the optimum tracking point is reached in the tracking channel, maximum correlation occurs in the lock detector channel during the early correlation portion of the retarded PN code, and virtually no correlation occurs during the late correlation portion. Therefore when the output of a square-law detector in the separate lock detector channel is phase detected with respect to the dithering frequency reference, the late correlation voltage signal, that is essentially due only to noise, is effectively subtracted from the early correlation voltage signal produced by full code correlation to yield a DC signal at the output of the lock detector channel with a level proportional to the degree of correlation and relatively independent of the noise level.

The novel features of the invention are set forth with particularity in the appended claims. The invention will best be understood from the following description when read in conjunction with the accompanying drawings.

DESCRIPTION OF PREFERRED EMBODIMENT

Figure 1:
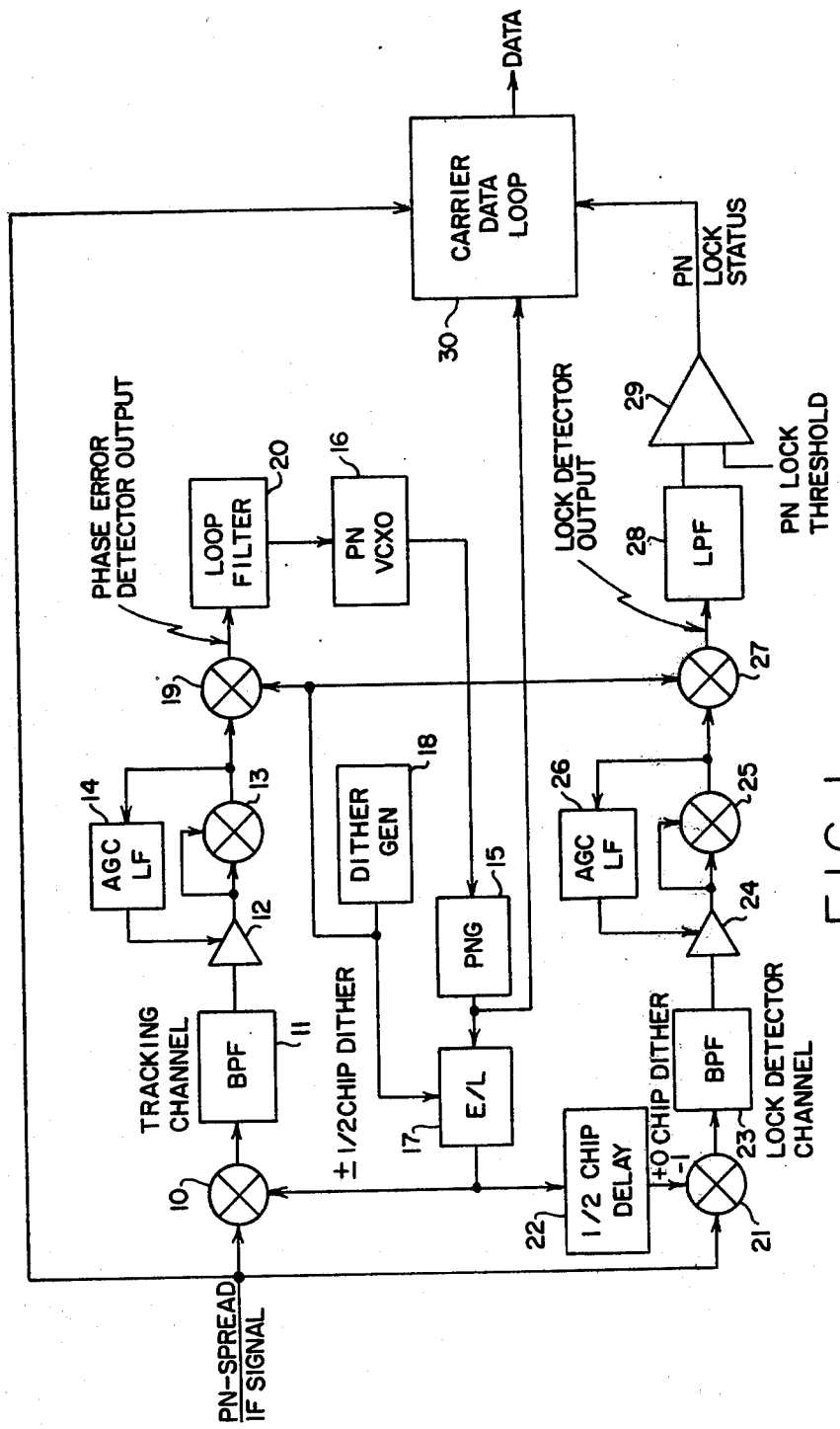
FIG. 1 is a functional block diagram illustrating the present invention.

Referring to the functional block diagram of FIG. 1, a PN-spread IF signal is received at the input of a PN tracking channel comprised of correlation means (multiplier) 10, bandpass filter 11, amplifier 12, square-law detection means (multiplier) 13 and an automatic gain control loop filter 14. A PN code generator 15 produces a local PN code at a rate controlled by a voltage controlled crystal oscillator (VCXO) 16.

The output of the PN generator is applied to the correlation means 10 through an early-late (E/L) dithering means 17 which advances and retards the local PN code $\pm\frac{1}{2}$ chip at a low frequency with respect to the PN code repetition rate. For that purpose, a dither generator 18 includes a circuit that produces a binary signal at a low frequency (typically 200 Hertz) as compared to the PN code repetition rate so that several cycles of the PN code received are correlated with an early PN local code and then several cycles of the PN code received are correlated with a late PN local code. In practice, the dithering means may be implemented simply as a circuit which delays the PN code one chip when the output of a dither generator 18 is false (0) and which does not delay the PN code (i.e., is bypassed) when the output of the dither generator is true (1). Such a circuit may be a single D-type flip-flop at the output of the PN generator. That flip-flop is bypassed when the output of the dither generator is true, and is otherwise used as a delay flip-flop clocked by the VCXO. When the received PN code and the local code are correlated, a partially despread IF signal appears at the output of the bandpass filter 11. This IF signal is then amplified and square-law detected to obtain a DC signal proportional to the degree of correlation, and this DC signal is correlated with the dither control signal in a multiplier 19 which functions as a phase error detector. The phase error thus detected is filtered by a loop filter 20 to provide a control voltage for the VCXO.

Figure 2:
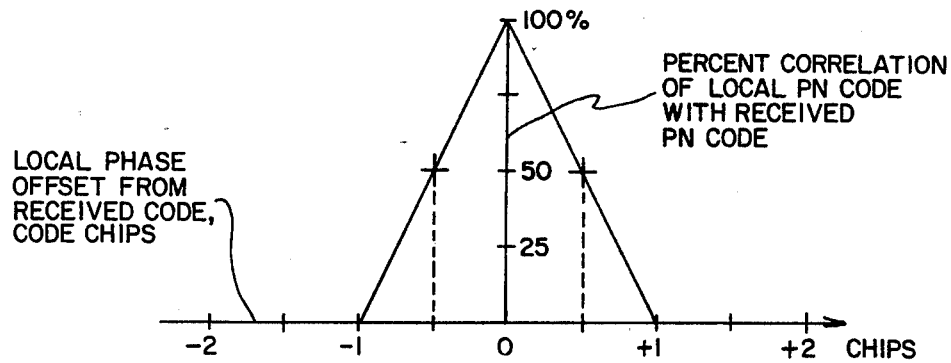
FIG. 2 is a graph showing dithering relationships for a dithered PN code tracking loop phase error detector.
Figure 3:
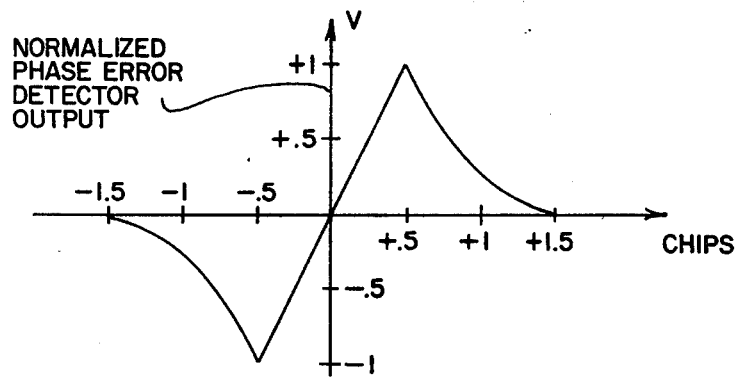
FIG. 3 is a graph of the normalized phase error detector output from the received PN tracking channel in FIG. 1.

FIG. 2 plots PN code correlation as a function of phase error in terms of code chips and indicates the $\pm\frac{1}{2}$ chip dither between the 50% correlation points that constitutes the normal locked operating point for the tracking loop. FIG. 3 shows the phase error detector output characteristic after subtraction of the late correlation voltage from the early correlation voltage. (These figures do not show effects of noise.) The square-law detector output integrated by the filter 14 is used for AGC control so that the phase error detected signal is dependent only on the degree of correlation and not on signal strength.

The basic organization and operation of a dithered PN tracking channel has thus been described. In summary, the PN-spread IF signal is correlated with a version of the PN code sequence dithered alternately a half chip early and a half chip late. When the received PN-spread sequence and the dithered local PN sequence are correlated, a partially despread IF signal appears at the tracking channel output. This signal is supplied to the multiplier 13 where it is amplified and square-law detected to obtain a DC signal proportional to the degree of correlation. That signal is then correlated with the dither control signal to provide a phase error detector signal for control of the VCXO to form a closed loop for PN code lock.

A separate channel similar to the PN tracking channel is used for determining phase lock of the PN code. The input to this channel is the PN spread IF signal. Correlation means (multiplier) 21 receives the dithered PN code applied to the correlation means 10 of the tracking channel through a half chip delay means 22 so that the PN code into the lock detector channel is always lagging the PN code into the tracking channel by a half chip. This delay means may be implemented as a D-type flip-flop synchronized with the PN generator one half a PN code clock period later. This can be done by selecting a D-flip-flop which triggers off the opposite clock edge thus providing one-half chip delay. The output of the delay means 22 is thus a dithered PN code further delayed a half chip so that the net is a +0, −1 chip dither of the PN code.

The output of the correlation means 21 is filtered through a bandpass filter 23, then amplified and square law detected with AGC by an amplifier 24, multiplier 25 and AGC filter 26. The result is a DC signal proportional to the correlation between the received PN code in the PN-spread IF signal and the dithered and half chip delayed local PN code. Thus, when the optimum tracking point is reached, as controlled by the tracking channel, maximum correlation occurs in the lock detector channel during the early portion of the half chip delayed and dithered code (i.e., while the local PN code out of the dither means 17 is half chip early), and virtually no correlation occurs during the late portion of the half chip delayed and dithered code (i.e., while the PN code out of the dither means 17 is a half chip late). This is so because the half chip delay during the early portion cancels the half chip advance in phase in the dithered PN code, and during the late portion augments the half chip delay in the dithered PN code to a full chip delay. The output of square-law detector 25 during the early portion of the dither due to full correlation is therefore much greater than for the late portion (essentially due only to noise). When the DC output from the square-law detector 25 is correlated (multiplied) by the dithered reference signal in a multiplier 27, the late correlation produced by noise voltage is effectively subtracted from the early correlation voltage produced by full code correlation. This yields a DC lock detector output signal which is proportional to the degree of correlation and is relatively independent of the noise level in the channel except for AGC suppression effects.

The output of the multiplier 27, the lock detector output, is filtered through a low-pass filter 28 and threshold detected in an amplifier 29 to produce a PN lock status signal applied to a data loop 30 which receives the PN-spread IF signal and the synchronized local PN code from the PN generator 15, and uses both to synchronize data modulated on the IF signal once the PN lock status indicates PN lock has been achieved by the PN tracking loop. It should be noted that if the dither means is implemented as a D-type flip-flop that is used as noted hereinbefore, the local PN code out of the generator 15 will be a half chip early when the PN lock status is present, but a half chip delay may be introduced at the input of the data loop to synchronize the PN code and VCXO with the PN spread IF signal.

Figure 4:
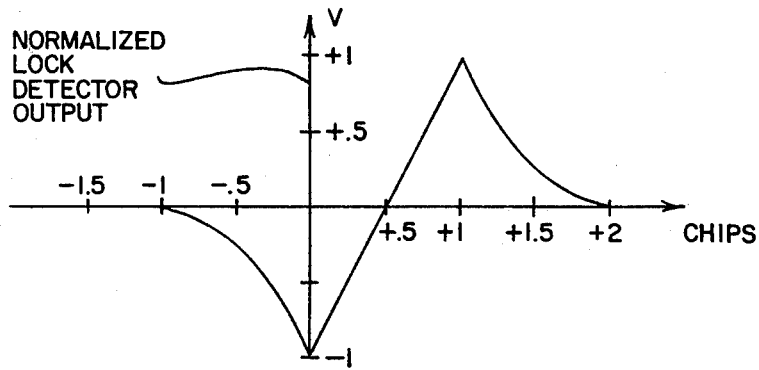
FIG. 4 is a graph of the normalized phase error detector output of the lock detector channel of FIG. 1.

FIG. 4 shows the lock detector output characteristic after subtraction of the late correlation voltage from the early correlation voltage. Lock is indicated by a negative output voltage from the detector. This lock detector has been tested with excellent results. It provides a lock indication that is relatively independent of the noise level in the IF signal, and takes full advantage of the dither technique used in the tracking channel for phase error detection to eliminate gain and detector offset problems that would arise if separate and independent channels were used. In addition, there is a significant saving in hardware.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a PN code tracking loop for receiving a PN-spread IF signal, said loop having a dithered local PN code signal which is dithered $\pm\frac{1}{2}$ code bit period at a predetermined rate controlled by a dither reference signal, and having a correlation in which said dithered local PN code is correlated with said PN-spread IF signal to control a local oscillator for synchronizing a PN code generator, a method for producing an indication of PN code tracking loop lock comprising the steps of delaying the dithered local PN code signal by a half code bit period, correlating the dithered and delayed PN code signal with said PN-spread IF signal to obtain a DC signal proportional to the correlation of the signals correlated, and phase detecting the DC signal with the dither reference signal to obtain an output signal the amplitude of which is proportional to the degree of correlation between said local PN code signal and said PN-spread IF signal independent of IF signal strength and independent of noise level.

2. A method as defined in claim 1 including the further step of threshold detecting said output signal for a predetermined degree of PN correlation.

3. A method as defined in claim 1 wherein said step of correlating the dithered and delayed PN code signal with said PN-spread IF signal includes multiplying the signals correlated and square-law detecting the product with automatic gain control between the output and the input of the square-law detection step.

4. In a delay-lock dithered PN code tracking loop for tracking a received PN-spread IF signal, apparatus for an indication of lock in said PN code tracking loop, wherein said loop utilizes a local PN code signal dithered by $\pm\frac{1}{2}$ a code bit period in response to a dither control signal, a lock detector channel comprising
means for delaying said dithered local PN code signal by half a code bit period,
means for correlating said dithered and delayed local PN code signal with said received PN-spread IF signal to produce a DC signal proportional to the degree of correlation between said signals, and
means for phase detecting said DC signal with said dither control signal to produce a DC lock detector output signal proportional to the degree of correlation between said received PN-spread signal and said dithered and delayed local PN code.

5. A lock detector channel as defined in claim 4 wherein said means for correlating said dithered and delayed local PN code signal with said received PN-spread IF signal is comprised of means for multiplying said signals correlated, and means for square-law detecting the product output signal of said multiplying means with automatic gain control feedback between the output and the input of said square-law detector.

6. A lock detector channel as defined in claim 5 including means for threshold detecting said output signal for a predetermined degree of PN correlation.

* * * * *